United States Patent [19]

Markus et al.

[11] Patent Number: 5,350,026
[45] Date of Patent: Sep. 27, 1994

[54] POWER-DRIVEN ELECTRICAL HAND TOOL

[75] Inventors: Heule Markus, Widnau; Gerschwiler Othmar, Wattwil, both of Switzerland

[73] Assignee: Ceka Electrowerkzeuge AG & Co. KG, Wattwill, Switzerland

[21] Appl. No.: 981,351

[22] Filed: Nov. 25, 1992

[30] Foreign Application Priority Data

Oct. 7, 1992 [DE] Fed. Rep. of Germany ....... 4233712

[51] Int. Cl.⁵ .................................. B25B 23/157
[52] U.S. Cl. .................................. 173/178; 81/475
[58] Field of Search ............... 173/13, 15, 178, 117, 173/18, 19, 146, 217, 165; 81/473, 474, 475, 476

[56] References Cited

U.S. PATENT DOCUMENTS

| | | | |
|---|---|---|---|
| 1,832,123 | 11/1931 | Holland | 173/13 |
| 2,113,512 | 4/1938 | Kesterton. | |
| 2,884,103 | 4/1959 | Connell | 81/475 |
| 3,442,360 | 5/1969 | Fulop | 81/475 |
| 3,477,521 | 11/1969 | Kiester et al. | 173/15 |
| 3,969,961 | 7/1976 | Amoroso. | |
| 4,154,308 | 5/1979 | Goldsberry et al. | 173/178 |
| 4,913,242 | 4/1990 | Lo | 173/178 |
| 5,060,733 | 10/1991 | Kress | 173/13 |
| 5,094,133 | 3/1992 | Schreiber | 173/13 |

FOREIGN PATENT DOCUMENTS

| | | |
|---|---|---|
| 645466 | 5/1937 | Fed. Rep. of Germany. |
| 1092398 | 11/1960 | Fed. Rep. of Germany. |
| 1092399 | 11/1960 | Fed. Rep. of Germany. |
| 3321931 | 1/1984 | Fed. Rep. of Germany. |
| 3637852 | 3/1988 | Fed. Rep. of Germany. |
| 72507 | 4/1993 | Fed. Rep. of Germany. |
| 443758 | 10/1912 | France. |
| 1500685 | 11/1967 | France. |
| 2415521 | 8/1979 | France. |
| 1069852 | 5/1967 | United Kingdom. |
| 2146562 | 4/1985 | United Kingdom. |

*Primary Examiner*—Scott A. Smith
*Attorney, Agent, or Firm*—Darby & Darby

[57] ABSTRACT

In a power-driven electrical hand tool, especially an electric screwdriver, with a coupling that undoes the drive connection between driving electric motor and tool output shaft when the working process is complete, and with an output shaft mounted so as to be displaced axially with a depth stop, it is proposed that the coupling be configured as a friction coupling which produces the drive connection at least predominantly by frictional engagement on the basis of the applied pressure exerted on the output shaft, which friction coupling separates the drive connection again when the applied pressure is reduced or absent, force deflection elements being provided that transmit the pressure effect received from the applied pressure via the output shaft, with concurrent amplification, to the annular coupling surfaces effecting the nonpositive frictional entrainment.

21 Claims, 5 Drawing Sheets

POWER-DRIVEN ELECTRICAL HAND TOOL

BACKGROUND OF THE INVENTION

The invention relates to a power-driven electrical hand tool according to the preamble of claim 1.

Electrical hand tools that have a coupling between the driving electric motor and the output shaft of the tool are known in many forms, primarily in "electric screwdrivers," i.e. screwdriving tools that are intended to be made capable by means of at least one such coupling, when a predefined torque is reached, of interrupting power transfer, preferably noiselessly, i.e. without any reciprocal sliding or chattering of the coupling claws of the said coupling as they release from engagement.

Particular discussion will also be devoted below to publications in the screwdriver area relating to the prior art, although it is understood and hereby noted that the invention is not confined to electric screwdrivers or screwdriving tools, but can be utilized, in the context of power-driven electrical hand tools, wherever abolition of the drive connection between driving electric motor and tool output shaft is desired.

For example, in a motor-driven automatic-shutoff screwdriver (DE-OS 30 15 423), it is known that when a preset limit torque is exceeded, a snap-lock coupling makes contact and thereby moves a coupling element by the fact that cylindrical rollers held in depressions exert pressure on a coupling sleeve, thus causing a locking apparatus to respond.

The latter then firmly holds the said coupling element in its position attained when the snap-lock coupling made contact, and the entrainment coupling is not positively engaged again until the tool spindle has been pushed in past a position identified by a pressure point. Noiseless coupling cannot, however, be achieved with such a coupling; instead the various operating ranges, as mentioned explicitly in said DE-OS 30 15 423, are clearly distinguishable by the difference between continuous rotation in the normal range and pulsed rotation in the overload range.

However, precisely in order to prevent the claws of the coupling from continuing to strike against one another if loading persists (the screwdriver still being engaged in the screw head) once a limit torque, adjustable by means of a depth stop, has been reached—which can cause considerable noise and substantial wear on the claws—an attempt has been made elsewhere (DE-OS 35 10 605) completely to disengage the positive working connection to the drive-side coupling element. For this purpose, there is arranged between the two halves of the claw coupling provided a spring-loaded intermediate disk, also having claws or cam projections on both sides, which sits on the tool drive shaft in a freely rotatable and axially displaceable manner. At its end surfaces, this intermediate disk is linked on one side by means of cams and on the other side by means of claws to the correspondingly and complementarily configured adjacent coupling elements, the claws, on one side, having axially elevated oblique surfaces so that the intermediate disk can also be displaced axially. At the moment at which the limit torque is reached, or at which the axially displaceable drive shaft has moved so far outward (relative to the depth stop) that the cams of one of the coupling regions can for the first time no longer transfer torque, the intermediate disk allows complete, spring-aided separation of these coupling elements, since at this moment on the other side of the intermediate disk the claws slip off the oblique surfaces, thereby additionally opening up the axial clearance in the cam transfer region of the coupling. The additional placement of the intermediate disk and the corresponding increase in space requirement can present problems here, making the overall structure more complex. In particular, this intermediate disk—free to move axially and radially—constitutes an additional member of the unit that is subject to wear and may therefore possibly increase its susceptibility to malfunction.

A further known coupling for power-driven screwdriving tools (DE-PS 36 37 852) attempts to address this problem by completely omitting the additional intermediate disk and configuring the transition region between the coupling element of the claw coupling on the drive shaft side and the drive shaft itself in a particular manner, forming a drag coupling. This drag coupling allows relative rotary motion between the drive shaft and the said coupling element over only a small angle, and is implemented by the fact that a transverse pin arranged nonrotatably on the drive shaft engages in blind holes or oblique transverse guides on the coupling element. A concurrent result of these oblique stop surfaces is that as the transverse pin shifts in its guides, an axial relative displacement occurs between the coupling element and the drive shaft, ensuring, in a known manner, that as the unit uncouples when the desired screwdriving depth is reached, the claw coupling separates completely as soon as the transferred torque disappears (i.e. when the limit torque is reached) by additionally increasing the clearance.

Lastly, this kind of solution according to DE-PS 36 37 852 is amplified upon by a further known power-driven screwdriving tool (EP 0 382 149 A1) in which, while the fast uncoupling processes effected by the oblique surfaces in the transition region on the drive-shaft-side coupling element are retained, at least one open recess, oriented axially outward from the screwdriving tool, is configured in the form of a guide pocket, the base of the recess running obliquely with respect to the drive shaft's long axis. A transverse pin nonrotatably mounted on the drive shaft engages in this guide pocket to form the drag coupling.

The underlying object of the invention is to improve these power-driven electrical hand tools—some of which are extremely complex in terms of both configuration and function—so that a considerably simpler structure can be attained while retaining smooth, noiseless uncoupling when the predefined screwdriving depth is reached.

SUMMARY OF THE INVENTION

The present invention has the advantage that only a single coupling is required, in contrast to the at least two coupling devices (entrainment coupling, drag coupling) hitherto required, while nonetheless allowing completely noiseless uncoupling.

The coupling process cannot occur at all until the operator exerts on the tool in question a working pressure that is required, for example, when a screwdriver, which in any event represents the preferred exemplary embodiment of the present invention, needs to be used to insert a screw into a panel or some other material. Such pressure is already required so that the particular screwdriver bit—the insert in the tool receptacle—does not lose its working connection with the screw; simultaneously therewith, this produces a gentle, completely chatter-free coupling engagement that does not automatically release again until, at a preset screwdriving depth, set for example by means of a depth stop, the working pressure exerted by the operator is removed from the screw and thus from the tool output shaft that is causing it to rotate.

Tests associated with continuous-duty experiments have shown that despite the fact that coupling engagement is produced by friction, the amount of wear occurring is minimal; this is attributable, among other factors, to the large surface areas participating in the coupling engagement, so that the wear patterns resulting after long-term use are substantially more favorable than in those working devices that must operate with a plurality of interengaging couplings.

A further advantage of the present invention is the fact that despite the omission of a positive engagement, the coupling process also proceeds smoothly, since complete nonpositive engagement between the participating coupling elements occurs very quickly even with slight pressure, without any slippage. Moreover, it is immaterial whether the driving electric motor is already rotating when coupling occurs—i.e. is entraining the one coupling element in the drive head region—or whether the electric motor is turned on by the operator, by actuating an electrical switch, only after the coupling has already "meshed" as a result of working pressure applied to the hand tool. In either case, the result is smooth, noiseless entrainment of the tool output shaft and secure uncoupling at the moment when, based on the depth stop, the screwdriving process can be considered complete.

A further advantage in this connection is that the solution according to the invention dispenses entirely with claw shapes on coupling members (which are often difficult to manufacture), and requires only components that can be manufactured by simple lathe-turning processes, in some cases followed by finish grinding. The coupling, which operates entirely by nonpositive engagement, therefore requires a certain applied pressure to produce rotary entrainment of the tool output shaft, and automatically terminates the screwdriving process in a noiseless, precise, and particularly low-wear manner, once the desired screwdriving depth has been reached—and does so even if the user simply relaxes the pressure, even without any depth stop being effective.

It is particularly advantageous if the nonpositive friction coupling is configured in the form of cylindrical annular surfaces that engage into one another and extend parallel to the output shaft, the pressure that needs in any case to be applied by the user producing, as a result of a slight, inwardly oriented movement of the tool output shaft, simultaneously a considerable amplification of force and conversion into a radial action that can be utilized for coupling. For this purpose it is possible to provide balls which, somewhat in the manner of a freewheel, lock a power takeoff collet that thereby, on the drive side, comes into working engagement with a rotary-driven coupling sleeve.

The nonpositive friction coupling implemented by the invention is thus also suitable for very high levels of transferred torque, since nonpositive engagement is established very quickly.

In a further embodiment, the annular surfaces involved can be made wedge-shaped with predefined angles, or, if desired, can additionally or solely have a rather gentle profile, ensuring a kind of "nonpositive engagement" even if changes in applied pressure occur during operation; this prevents any (undesired) slippage.

BRIEF DESCRIPTION OF THE DRAWINGS

Exemplary embodiments of the invention are depicted in the drawings and will be explained further in the description that follows. In the drawings:

FIG. 2 shows the same depiction as FIG. 1, but with the output shaft completely coupled; while

DESCRIPTION OF THE PREFERRED EMBODIMENT

The basic idea of the present invention consists in arranging and configuring a friction coupling, configured approximately in the manner of a freewheel and having no substantial positive engagement between the output shaft of an electrical hand tool and the electric motor that drives it at least directly, so that when the working pressure, with which for example a screw is to be driven into a particular material, is exerted on the electrical hand tool, the coupling engages; and when a limit torque is reached, or when a depth stop contacts the surface of the material, the latter generates a pressure counteracting the pressure applied by the operator on the unit, thereby noiselessly and precisely undoing the nonpositive coupling.

Figure 1:
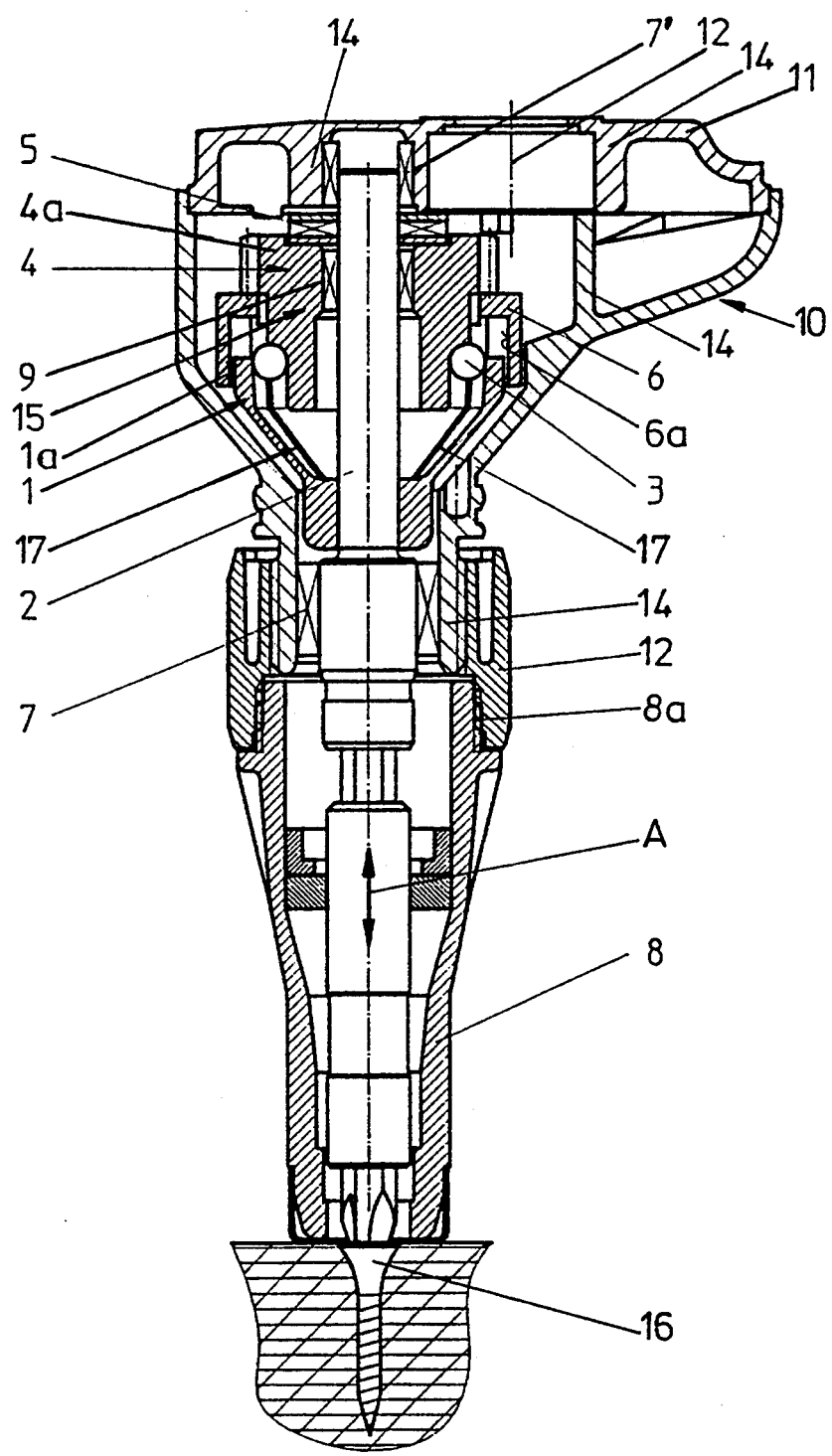
FIG. 1 shows a vertical sectioned view, constituting a partial depiction, through a front drive head region, especially of a screwdriver (automatic-shutoff screwdriver), with the output shaft in the uncoupled position.
Figure 2:
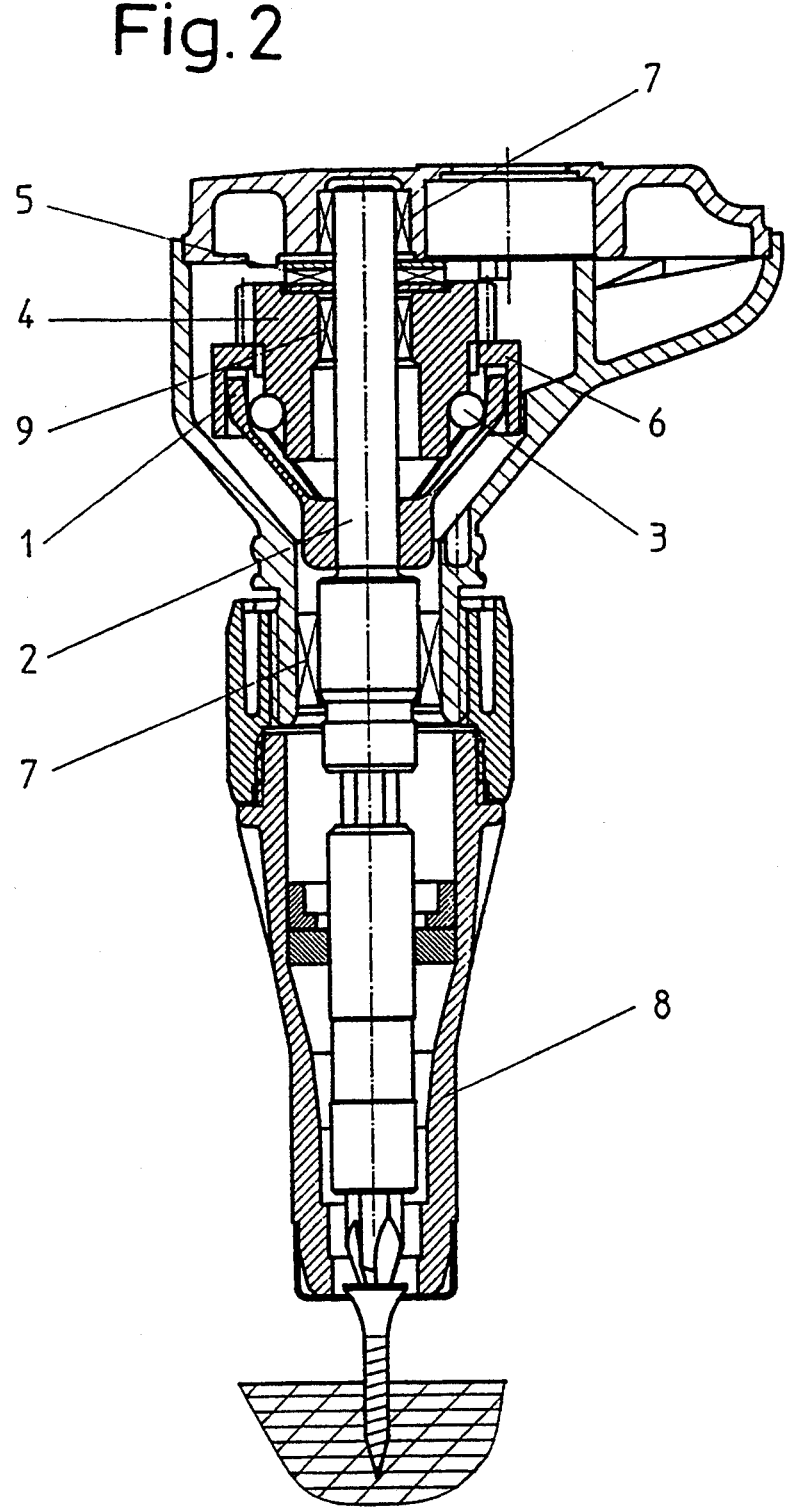

Since identical parts with identical functions are depicted in all the Figures, the reference numbers in the Figures are also identical in each case. The partial housing shown in FIG. 1, which essentially contains the coupling, will hereinafter be referred to as the drive head 10, and is set on, set, bolted, or flanged onto, or otherwise fastened to an adjacent housing 11, depicted only partially, which accommodates further components of an electrical hand tool, an electric motor power takeoff shaft, which for example can carry a pinion that meshes with a first coupling element 4, being indicated in FIG. 1 only with dot-dash lines at 12. Of course it is understood that in place of a pinion joined directly to a motor output shaft, a gear system or other intermediate transmission element can also be provided here.

Set on the drive head 10 is an adjustable depth stop 8 which is configured as a hollow, tapering sleeve and, for example by means of an intermediate thread 8a, is in operating engagement with a rotary sleeve 12', preferably made of plastic, that is set on the lower end of the drive head 10, facing the screw, so as to perform a rotary motion.

Extending through the drive head 10 and depth stop 8 is an output shaft 2 that is mounted in a plurality of radial bearings 7, 7' rotatably, but also so as to move axially, i.e. in the direction of double arrow A.

It should be mentioned at this juncture that the basic structure of the hand tool parts that serve to entrain a tool and are thus at the front, such as the drive head, depth stop, and output shaft bearings, and their shape, are fundamentally arbitrary, and that the embodiment depicted in FIGS. 1 to 4 is regarded as preferred solely and especially for an automatic-shutoff screwdriver.

Drive head housing 10, the partly depicted motor housing 11, and the remaining components each have ribs, projections, recesses, and the like, which are labeled as a whole with the number 14, and can serve to mount various parts, for example the radial bearings for the output shaft 2, or to receive and fasten other components.

The region of the friction coupling is labeled 15, and comprises a coupling element 4 on the drive motor side—which in the embodiment depicted is mounted on the output shaft 2 so as to rotate freely, but naturally can also be mounted in some other manner—and a coupling element 1 on the output shaft side, which can perform an entraining function on the basis of the applied pressure exerted on the output shaft 2.

For this purpose, there are provided on the two coupling elements 1 and 4 annular surfaces oriented towards one another, which are pressed together as a function and as a result of the action of the applied pressure, so that the coupling element driven by the motor 4 is capable of entraining the output shaft 2.

In particular—but not in a manner so as to limit the context of the present invention—the motor-side coupling element 4 consists of a coupling gear 4a that is mounted by means of a separate radial bearing 9 on the output shaft 2, and is furthermore braced via an axial bearing 5 at the rear (i.e. on the side facing away from the screw being driven) against stationary housing elements.

A coupling ring that hereinafter will be referred to as a coupling housing 6 is fastened to the coupling gear 4a, for example being nonrotatably retained by means of keyways; it is understood, however, that the coupling sleeve 6 can also be configured as a single unit with the coupling gear 4a, which is simply a matter of simplified manufacturing and assembly of the individual parts.

In the embodiment depicted, the coupling sleeve 6 forms on the inside a first radial annular coupling surface 6a extending axially, against which a counterpart annular coupling surface 1a comes into contact, i.e. being pressed against it, when a working pressure is exerted on the electrical hand tool, resulting in an inwardly oriented displacement movement of the output shaft 2.

Figure 3:
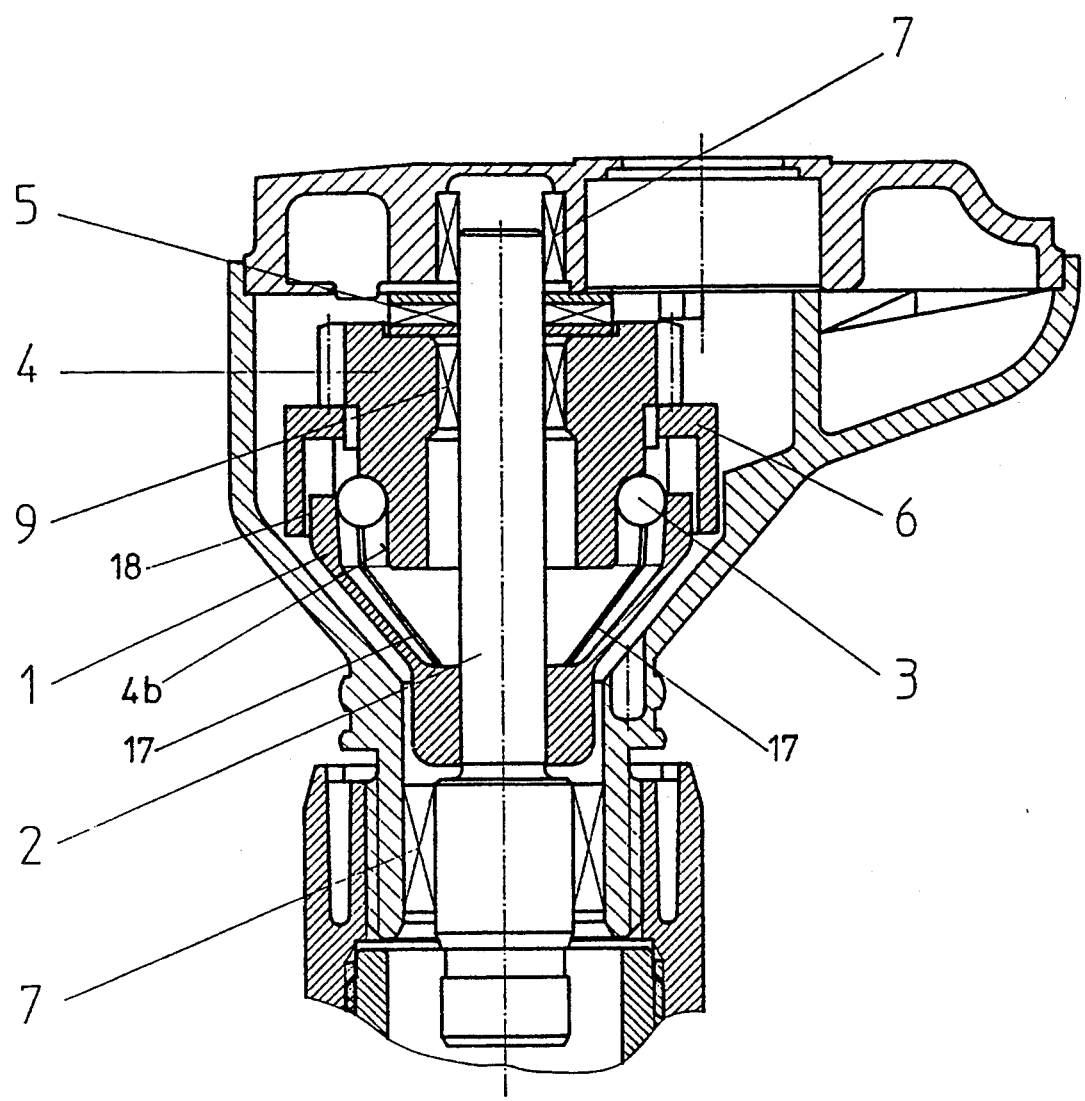
FIGS. 3 and 4 show, in that order and greatly enlarged, the coupling region alone, in the fully uncoupled position corresponding to FIG. 1, and in the fully coupled position corresponding to FIG. 2.
Figure 4:
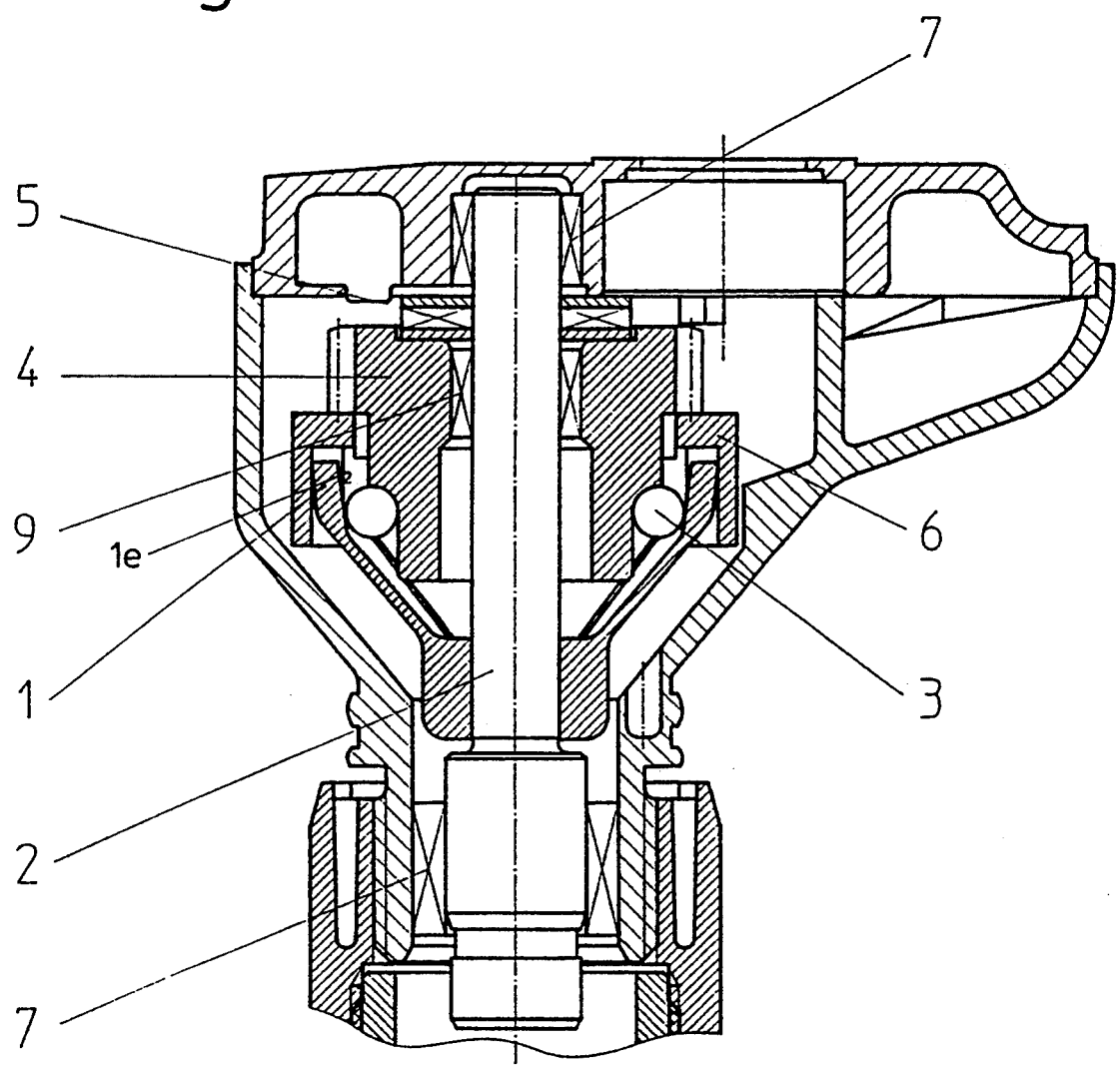
Figure 5:
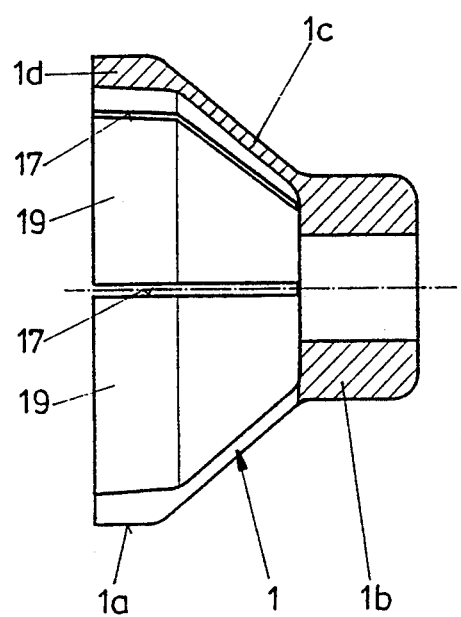
FIGS. 5 and 6 show, in a sectioned side view and in a front view, one of the coupling elements constituting the friction coupling of the present invention, in a preferred embodiment.
Figure 6:
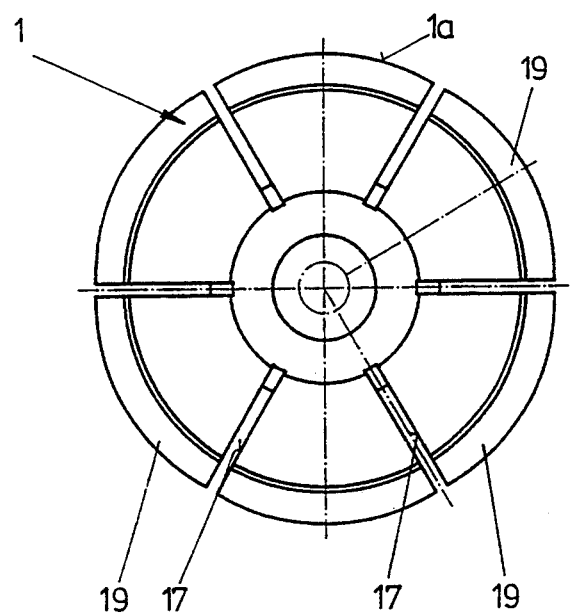

For further explanation, reference is made first to the depiction of FIGS. 5 and 6, and then to the enlarged depictions of FIGS. 3 and 4, since the following explanations deal especially with the coupling structure as a preferred exemplary embodiment.

Thus the other coupling element 1 is configured as a kind of coupling collet that has a hub 1b that sits on the output shaft 2 both nonrotatably and without the possibility for axial displacement, as depicted in FIGS. 3 and 4.

The coupling element 1 furthermore has transition regions that lead to the expanded annular shape of the counterpart coupling surface 1a; these transition elements consist of an expanding conical form 1c, preferably in a single unit with the hub 1b, which merges as a single unit into a preferably also thickened annular cylinder 1a, the outer surface of which forms the counterpart coupling surface 1a.

Preferably both the conical region 1c and the annular cylinder 1d are configured with a plurality of slits, such that for example, as shown by the depiction of FIG. 6, a total of six slits 17 are provided, resulting in coupling element segments each of approximately 60°.

The slitting obviously creates the possibility of expanding the conical region, which simultaneously corresponds to expansion in the region of the annular cylinder, the individual segments furthermore having an individual spring stiffness that, in the case of the coupling function yet to be explained below, counteracts expansion.

Referring back now to the depictions of FIGS. 3 and 4, it is evident that there are provided, as the last element completing the coupling structure, means deflecting the action of the applied force, so that the two mutually engaging coupling surfaces 6a on the coupling sleeve 6 and the coupling gear 4a and the outside surface 1a of the annular cylinder can arrive at an engaged state causing rotary entrainment.

In the exemplary embodiment depicted, these are pressure elements on which the inner surface of the annular cylinder 1d of the coupling collet slides during axial displacement, which simultaneously causes radial expansion of the annular cylinder so that its outer surface comes into contact, as the counterpart coupling surface 1a, with the inner surface 6a of the coupling sleeve 6.

To reduce friction here, balls 3 are provided, which sit in a suitable annular recess 4b of the coupling gear 4a, for example each in separate pockets, perhaps formed by milling, or also completely filling the annular form of the recess 4b in a peripheral manner, and retained by the partial annular cylinder of the coupling collet, which even in the uncoupled state (see FIG. 3) still at least partly covers the balls 3.

The following function then results. When the driving electric motor (not depicted) causes the first coupling element 4 in the form of the coupling gear 4a to rotate, and the output shaft 2 is initially in the position depicted in FIG. 3, i.e. extended towards the screw 16 being drive (see also FIG. 1), there then exists at least a very small space 18 (although shown larger in the depiction of FIG. 3) between the aforesaid mutually facing annular coupling surfaces of the coupling sleeve 6 and annular cylinder 1d of the coupling collet.

In the working position, i.e. in the transition from FIG. 3 to FIG. 4, if the output shaft, with the coupling collet solidly connected thereto and constituting the other coupling element 1, is then pressed towards the coupling gear 4a, the inner annular surface 1e of the annular cylinder 1d makes contact with the balls 3 and, because of the multiple slitting of the coupling collet, can expand it, so that the individual annular cylinder segments 19 are pressed outward approximately as depicted in FIG. 4, and the two corresponding annular coupling surfaces come into contact. Rotary entrainment of the output shaft 2 then ensues.

It is obvious that the force deflection created by the balls 3 resulting from the pronounced inwardly directed movement of the output shaft 2 produces a much smaller remaining distance to be covered between the respective annular coupling surfaces, resulting in a considerable, and in some circumstances even extreme, amplification of force, so that even modest levels of applied pressure exerted by the user are sufficient to ensure complete, non-slipping rotary entrainment.

In this context a further, essential embodiment of the present invention is significant, consisting in the fact that in the region of the components involved in the coupling process (including the balls), a certain taper can be advantageous, for example resulting from the fact that the individual partial segments of the annular cylinder 1d in the drawing plane of FIG. 4 taper from top to bottom, i.e. looking from the screw towards the motor, so that when the annular coupling cylinder 1d is first inserted into the coupling sleeve 6 the surface pressure of the annular coupling surfaces opposite one another is small but very quickly becomes much greater, until practically a kind of clamped state between the two coupling components—annular cylinder 1d and inner surface of coupling sleeve 6—results, caused by the outwardly acting force of the balls 3 sitting in the coupling gear 4a, they of course being unable to deflect.

The taper can be provided on the inner surface 1e of the annular cylinder 1d, and/or on its outer surface 1a constituting the counterpart coupling surface, and/or on the inner surface 6a of the coupling sleeve 6, the particular angle being best determined empirically and also depending to a certain extent on the specific torques being transferred. In experiments, for example, taper angles in the range of approximately 7° have proven especially favorable.

An alternative embodiment that can be provided, instead of a taper in the region of the surfaces involved or as a complement thereto, consists furthermore in the fact that, utilizing the segmenting of the annular cylinder 1d, which of course a priori leads to a circularity error because of the respective spring stiffness of the individual segments, a kind of profile can be incorporated into the inner coupling surface 6a formed by the coupling sleeve 6, which can be configured for example, in a manner complementary to the annular cylinder segments, as a circumferentially undulating profile, in other words one exhibiting elevations and depressions in the peripheral direction. Here again, empirical experiments are the best method of defining the undulation, which is always very small but which nevertheless means that non-slipping rotary entrainment occurs very quickly during coupling, while a flat undulation profile of this kind, if it is provided at all, cannot cause noise or produce wear during uncoupling.

It is advantageous if each of the annular surfaces is polished and hardened; this then also ensures that the individual segments retain their spring characteristics. Since an expansion takes place when pressure is exerted on the coupling collet, and this creates coupling entrainment in a nonpositive manner, the coupling collet retains the tendency to return from the expanded position because of its spring stiffness, so that when the depth stop strikes the material surface, at which point the axial pressure hitherto borne by the output shaft 2 is transferred over to the depth stop, immediate, noiseless uncoupling occurs. The coupling elements therefore move immediately into the idle position shown in FIGS. 1 and 3, in which the output shaft 2 and the coupling collet are stationary. Additionally, a compression spring can also be used here, pressing the output shaft axially outward and thus contributing to, or causing, release of the coupling.

In this connection, an embodiment already briefly referred to earlier also contributes advantageously to easy release of the coupling when the working pressure applied by the user of the tool is removed and/or when the depth stop contacts the material surface, consisting in the fact that the coupling sleeve 6 is configured as a separate component from the first coupling element 4 or the coupling gear 4a formed thereby, and is in nonrotatable working engagement with the coupling gear 4a only, for example, by means of multiple-wedge teeth, thereby allowing at least slight axial play.

Specifically, it has been found in experiments that, as would be immediately evident, when the coupling engages a certain clamped state results, which is also responsible for non-slipping transfer of torque, and the coupling collet releases from this clamped state optimally and especially easily if this slight axial play exists in the region of the coupling sleeve. The axial play of the coupling sleeve thus helps ensure that as the motor continues to run and with the rotary motion of the coupling gear 4a resulting therefrom, the rotatably entrained coupling sleeve 6, because of its axial freedom of movement, acts to reinforce the spring effect exerted by the coupling collet tending to spread out from the clamped connection and slip downward, i.e. towards the tool insert or the screw being driven, thereby moving the coupling from the position of FIG. 4 into the released position of FIG. 3.

The slight axial play of the coupling sleeve 6 is limited on the one hand by the tooth flanks of the coupling gear 4 on which the sleeve 6 is carried, and on the other hand by the fact that the keyways on the coupling gear and on the sleeve that effect rotary entrainment have a predefined length and that axial play is possible only within the ways.

Assuming correct adjustment of the spring forces of the coupling collet, the taper of the annular surfaces that interact to create coupling engagement, the clamping effect applied by the balls, and the axial play of the coupling sleeve 6, the result is then smooth operation with secure coupling, non-slipping continuous-duty loading, and smooth uncoupling without substantial wear on the friction coupling components.

Lastly, it should be mentioned that the claims, and especially the main claim, are attempts at putting the invention into words without a comprehensive knowledge of the prior art and therefore without limiting prejudice. The right to regard all features presented in the description, the claims, and the drawings, both individually and in any combination, as essential to the invention, and to record them in the claims, is therefore reserved.

We claim:

1. A power-driven electric hand tool, comprising:
coupling means for disengaging a drive connection between a driving electric motor and a tool output shaft, the output shaft being mounted so as to be displaceable axially, said coupling means being configured as a friction coupling for producing the drive connection by frictional engagement in response to an applied pressure exerted on said output shaft, said friction coupling separating said drive connection as the applied pressure decreases and when the applied pressure is absent, said coupling means including a first coupling element rotatably driven by the motor and a second coupling element mounted nonrotatably on said output shaft, said first and second coupling elements being telescopically arranged relative to each other, said coupling means further including force deflection elements that are responsive to a pressure on said output shaft for acting on one of said coupling elements for effecting coupling by radial movement of said deflection elements.

2. Power-driven electrical hand tool according to claim 1, wherein said force deflection elements transmit a pressure effect received from the applied pressure via the output shaft (2), with concurrent amplification, to annular coupling surfaces (1a, 6a) effecting nonpositive frictional entrainment of said coupling elements.

3. Power-driven electrical hand tool according to claim 2, wherein the annular coupling surfaces (1a, 6a) together effect rotary entrainment and run parallel to the output shaft (2), and at least one of the annular surfaces is radially expandable.

4. Power-driven electrical hand tool according to claim 1, wherein the first coupling element has a coupling sleeve (6) with an inner annular coupling surface (6a), and the second coupling element (1) has an annular cylinder (1d) with an outer annular coupling surface (1a), which experience any one of a greater and lesser degree of overlap corresponding to axial displaceability of the output shaft (2).

5. Power-driven electrical hand tool according to claim 4, wherein the coupling sleeve on the first coupling element (4) is received thereby nonrotatably, but with a predefined axial play relative thereto.

6. Power-driven electrical hand tool according to claim 1, wherein the first rotatably driven coupling element (4) is in the form of a coupling gear (4a) and is configured with a coupling sleeve (6) fastened thereto, and an expandable annular cylinder (1d), connected to the output shaft (2) in a nonrotatable and axially nondisplaceable manner, penetrates into the coupling sleeve depending on the position of the output shaft (2), and force deflection means which expand the annular cylinder in response to the applied pressure on the output shaft (2).

7. Power-driven electrical hand tool according to claim 6, wherein the coupling gear (4a) is arranged rotatably with the coupling sleeve (6) and axially nondisplaceably relative to a drive head (10), and the second coupling element (1) is arranged at a distance from the coupling gear (4a) on the output shaft (2), in a nonrotatable and axially nondisplaceable manner, by means of a hub (1b) from which proceed, in the direction of the coupling sleeve (6), annular cylinder segments of the annular cylinder (1d) that are afforded radial expansion due to axial slits therein, the force deflection means being in the form of pressure balls (3) sitting in an annular recess (4b) of the coupling gear (4a), and arranged at the height of an inner surface (1e) of the annular cylinder, said balls, when relative axial displacement occurs between said coupling sleeve (6) and said annular cylinder segments press said annular cylinder segments outward by expansion against their own spring stiffness to produce frictional coupling contact between an outer surface (1d) of the annular cylinder and an inner coupling surface (6a) of the coupling sleeve (6).

8. Power-driven electrical hand tool according to claim 7, wherein an adjustable-height depth stop (8), which surrounds the output shaft (2), is arranged on the drive head (10) by means of a threaded bushing (12).

9. Power-driven electrical hand tool according to claim 7, wherein the pressure balls (3) acting on the inner surface of the annular cylinder (1d) sit in separate receiving pockets on the coupling gear.

10. Power-driven electrical hand tool according to claim 7, wherein the balls (3) fill a receiving annular space on the coupling gear (4a) in a peripherally adjacent manner.

11. Power-driven electrical hand tool according to claim 6, wherein at least one of an inner surface (1e) on the annular cylinder (1d), and outer coupling surface (1a) on the annular cylinder (1d), and an inner coupling surface (6a) on the coupling sleeve (6), has a taper within 1° to 10° with respect to an axis of said output shaft.

12. Power-driven electrical hand tool according to claim 6, in which said tool includes a drive head housing and a motor housing, said output shaft (2) being mounted by means of radial bearings (7, 7') arranged in at least one of the housing of the drive head and the adjacent motor housing, and the coupling gear (4a) being mounted on the output shaft (2) by means of a further radial bearing (9) and mounted with respect to at least one of the housing (10) of the drive head and the motor housing by means of an axial thrust bearing (5).

13. A power-driven electric hand tool, comprising
coupling means for disengaging a drive connection between a driving electric motor and a tool output shaft, said output shaft being mounted so as to be displaceable axially, said coupling means including a coupling element (4), a coupling sleeve (6), a coupling collet having a collar fixedly connected to said output shaft and being split into a plurality of annular segments (19) which extend axially and radially outward from said collar, said coupling sleeve and said annular segments having mutually facing annular coupling surfaces which are separated from each other by a gap when said coupling collet is in an initial position relative to said coupling element, said mutually facing annular coupling surfaces closing said gap and engaging each other in response to displacement of said coupling collet towards said coupling element for effecting coupling by radial movement of said annular segments.

14. Power-driven electrical hand tool according to claim 13, further comprising balls between said annular segments and said coupling element, said annular surfaces of said annular segments pressing against said balls in response to said collet being displaced toward said coupling element so as to cause said annular segments to expand outwardly into said gap so that said mutually facing annular coupling surfaces engage each other.

15. Power driven electrical hand tool, comprising
coupling means for disengaging a drive connection between a motor and a tool output shaft, the output shaft being mounted so as to be displaced axially and the coupling means producing a drive connection in response to applied pressure exerted on the output shaft, said coupling means separating the drive connection as the applied pressure decreases and when the applied pressure is absent, said coupling means including a first, motor driven coupling element in the form of a coupling sleeve and a second coupling element mounted nonrotatably on the output shaft, wherein the second coupling element is an expandable annular cylinder (1d) having an outer annular coupling surface (1a) and penetrating into the first coupling element and pressure balls (3) for effecting radial movement of the annular coupling surface (1a) within the coupling sleeve (6) in response to said applied pressure.

16. Power-driven electrical hand tool, according to claim 15, further comprising a rotatably driven coupling gear (4a) on which is arranged the coupling sleeve (6); said pressure balls (3) sitting in an annular grove (4b) within the coupling gear (4a) and inside the annular cylinder (1d) of the second coupling element (1), the second coupling element being connected with the output shaft (2) in an axially non-displaceable manner.

17. Power driven electrical hand tool, according to claim 16, wherein the second coupling element formed by the expandable annular cylinder (1d) is mounted on the output shaft (2) via a hub (1b), the second coupling element being provided with axial slits which allow for radial expansion of segments of the annular cylinder, said axial slits being directed toward the coupling shell (6) and converging as one piece into the annular cylinder shape with the balls (3) arranged at the extent to which the inner surface (1e) of the annular cylinder in an annular groove (4b) of the coupling gear (4a) extends, the coupling sleeve (6) and the segments of the annular cylinder being fixed to the output shaft, pressing them outward by expansion against their own spring stiffness to produce frictional coupling contact of both coupling annular surfaces (1a, 6a).

18. Power driven electrical hand tool, according to claim 17, wherein the inner surface (1e) of the annular cylinder (1d) has a predefined taper of 1° to 10° with respect to an axis of the output shaft.

19. Power driven electrical hand tool, according to claim 16, wherein the pressure balls (3) act on an inner surface of the annular cylinder (1d).

20. Power driven electrical hand tool, according to claim 15, wherein an adjustable height depth register (8), which surrounds the output shaft (2), is arranged on a drive head (10) by means of a threaded bushing (12).

21. Power driven electrical hand tool, according to claim 20, wherein the output shaft (2) is mounted by means of radial bearings (7, 7') arranged in one of a housing of the drive head and an adjacent motor housing, and the coupling gear (4a) is mounted on the output shaft (2) by means of a further radial bearing (9) and mounted with respect to one of the housing (10) of the drive head and the motor housing by means of an axial thrust bearing (5).

* * * * *